United States Patent [19]

Teig

[11] Patent Number: 5,137,313

[45] Date of Patent: Aug. 11, 1992

[54] PALLET BUMPER FOR TRUCK TRAILERS

[75] Inventor: John L. Teig, Elkhart, Iowa

[73] Assignee: Ruan Leasing Company, Des Moines, Iowa

[21] Appl. No.: 764,350

[22] Filed: Sep. 23, 1991

[51] Int. Cl.⁵ .............................................. B60R 19/08
[52] U.S. Cl. ................................... 293/102; 52/403; 267/140
[58] Field of Search ............... 293/102, 1; 267/140; 52/403

[56] References Cited

U.S. PATENT DOCUMENTS

| | | | |
|---|---|---|---|
| 1,613,077 | 1/1927 | Bourgon | 293/102 |
| 2,263,063 | 11/1941 | Allen | 293/102 |
| 2,624,596 | 1/1953 | Clingman | 52/403 |
| 3,014,710 | 12/1961 | Layne | 267/140 |
| 3,608,882 | 9/1971 | Culp | 267/140 |
| 3,734,526 | 5/1973 | Propst | 293/102 |

Primary Examiner—Robert R. Song
Attorney, Agent, or Firm—Zarley, McKee, Thomte, Voorhees, & Sease

[57] ABSTRACT

A pallet bumper for truck trailers having an elongated plate with a plurality of space vertically disposed bumper elements secured thereto. The bumper elements are hollow resilient tubes having a center channel and at least one flat external side for positioning against the plate, with the center channel having a flat interior side parallel to the flat external side. A vertical flat bar extends along the length of the flat interior side of the center channel. A plurality of threaded bolts having head ends adjacent the plate extend through the plate, through the portion of the bumper elements between the flat external and interior sides thereof and then through the vertical flat bars. Nuts on the interior ends of the bolts secure the components together.

4 Claims, 1 Drawing Sheet

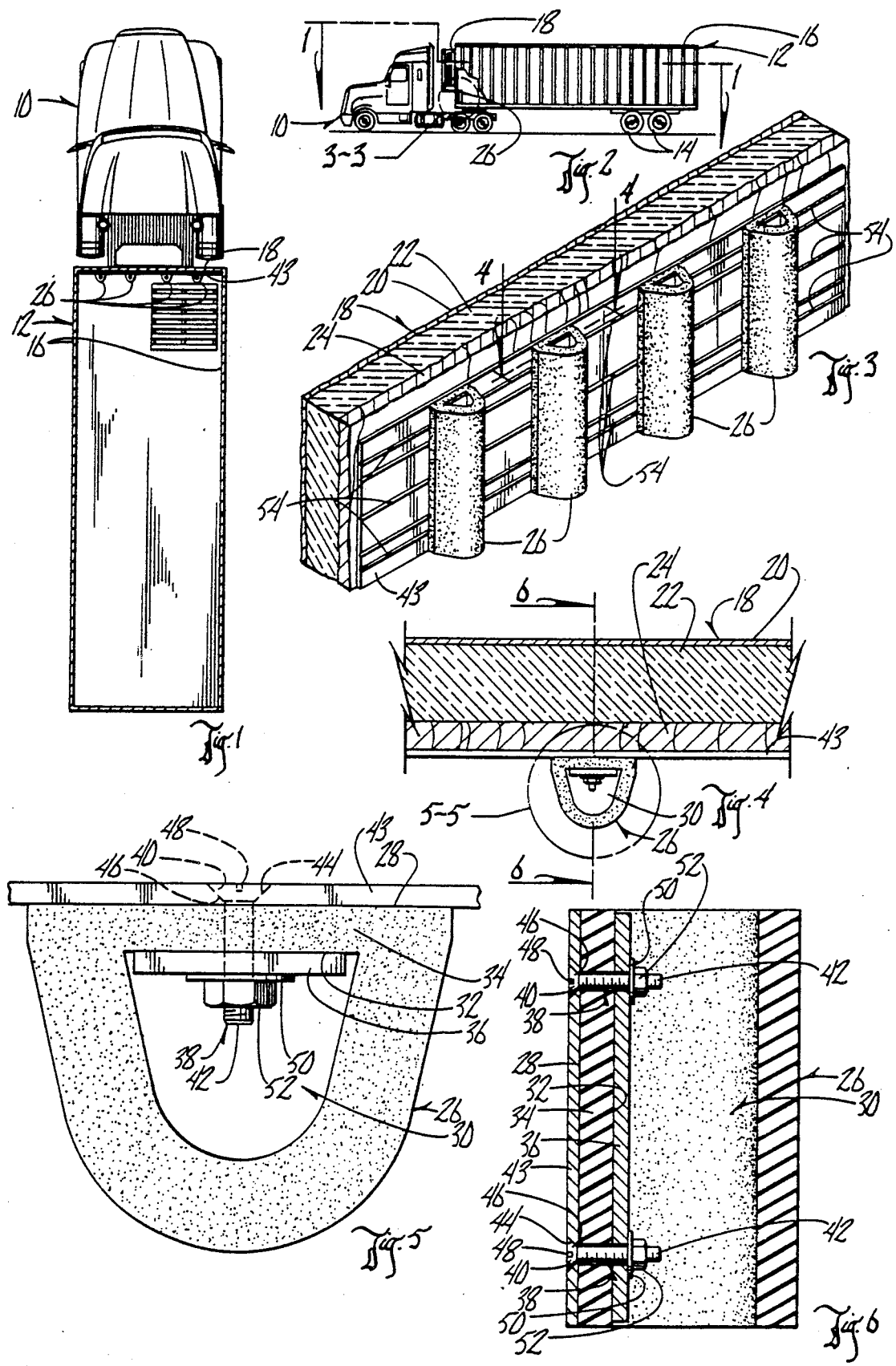

PALLET BUMPER FOR TRUCK TRAILERS

BACKGROUND OF THE INVENTION

Semi-truck trailers are commonly loaded and unloaded with fork trucks that extend tines or forks underneath pallets loaded with goods. As the pallets are loaded or unloaded at the forward end of the trailer, the pallets are often forced against the forward wall of the trailer. This can result in damage to the forward wall.

Bumper means have been installed on these forward walls. However, they either do not effectively protect the walls, or the bumpers are difficult to install or subject to damage during use.

It is therefore a principal object of this invention to provide a pallet bumper for truck trailers that is easy and inexpensive to fabricate, and durable in use.

These and other objects will be apparent to those skilled in the art.

SUMMARY OF THE INVENTION

The pallet bumper of this invention comprises an elongated plate to which are secured a plurality of vertically positioned bumper elements. The plate is adapted to be connected to the forwarded wall of a semi-truck trailer. The invention dwells in the means for securing the bumper elements to the plate. The bumper elements are hollow and have an inner channel, which has an interior flat wall opposite a flat exterior wall which is positioned against the plate. Threaded bolts with recessed heads flush with the outer surface of the plate extend through the wall, through the wall portion of the bumper element between the flat interior surfaces, through a vertical bar in the interior channel which extends the vertical length of the interior flat wall, to terminate in a threaded interior end. A washer and nut on the interior of the bolt bind the bumper element, the vertical bar, and the plate together.

BRIEF DESCRIPTION OF THE DRAWINGS

FIG. 1 is a partial sectional view of a semi-trailer truck utilizing this invention as taken on line 1—1 of FIG. 2;

FIG. 2 is a small scale side elevational view of the truck of FIG. 1 with a portion thereof broken away to show the location of this invention;

FIG. 3 is a large scale elevational view of the device of this invention;

FIG. 4 is a large scale plan view taken on line 4—4 of FIG. 3;

FIG. 5 is an enlarged scale elevational view taken on line 5—5 of FIG. 4; and

FIG. 6 is a large scale sectional view taken on line 6—6 of FIG. 4.

DESCRIPTION OF THE PREFERRED EMBODIMENT

Truck tractor 10 has secured thereto a conventional trailer 12 having wheels 14, side walls 16 and forward wall 18. Forward wall 18 is comprised typically of a forward skin 20, a layer of insulation 22, and a wood plate 24.

Bumper elements 26 are comprised of rubber or the like and are cut from conventional lengths of rubber material. The bumper elements per se do not comprise the instant invention.

The bumper elements include a flat exterior wall 28, a hollow interior channel 30, a flat interior wall 32, and a wall portion 34 between exterior wall 28 and interior wall 32.

An elongated flat metal bar 36 extends downwardly into the interior channel 30 and dwells against the flat interior wall 32. Threaded bolts 38 having a head end 40 and a threaded interior end 42 extend through a wall 43 which extends normally across the width of the forward wall 18 of trailer 12. Wall 43 is normally comprised of extruded aluminum. Wall 43 has a plurality of recessed tapered openings 44 which are complementary in shape to the tapered heads 46 of bolts 38. The heads 46 have a typical screwdriver slot 48 therein. A washer 50 embraces the threaded interior end 42 of bolts 38 and a typical nut 52 is also on the threaded interior end 42 of the bolts for tightening against the washer 50 and the flat bar 36. Normally, two such bolts would be used inside of each interior channel 30.

In operation, the device of FIG. 3 is positioned in the trailer 12 against the forward wall 18 as shown in FIGS. 1 and 2. A plurality of bolts or screws 54 (FIG. 3) are used to affix the wall 43 against the forward wall 18 of the trailer.

The device of FIG. 3 has been assembled by inserting the flat bars 36 into the interior channels 30 of the bumper elements 26, and securing the bumper elements to the wall 43 by means of the bolts 38, washers 50 and nuts 52 as described heretofore.

It should be noted that the instant invention resides in the precise way that the bumpers 26 are secured to the wall 43 by means of the bars 36, bolts 38, and nuts 52. The fabrication and assembly of the device of FIG. 3 is greatly facilitated by this invention, and this assembly is inexpensive and very durable. A wrench can be inserted into channel 30 to hold nuts 52 against rotation, and the nuts are "tightened" by use of a screw driver being used on slot 48. Thus, no extra tool opening needs to be cut in bumpers 26 to assemble bars 36.

Accordingly, it is seen that this invention will achieve at least all of its stated objectives.

I claim:

1. A pallet bumper for truck trailers, comprising,
   an elongated plate for positioning across the lower forward wall of a truck trailer,
   a plurality of spaced vertically disposed bumper elements secured to said plate,
   said bumper elements being comprised of hollow resilient tubes having a center channel and at least one flat external side for positioning against said plate, with said center channel having a flat interior side parallel to said flat external side,
   a vertical flat bar extending along the length of said flat interior side of said center channel,
   a plurality of threaded bolts having a head end adjacent said plate, said threaded bolts extending through said plate, through the portion of said bumper elements between said flat external and interior sides thereof, and thence through said vertical flat bar, and terminating in an interior end within said interior channel of said bumper elements,
   and fastening means on the interior ends of said bolts to bind said bumper elements tightly between said plate and said vertical bars.

2. The device of claim 1 wherein said bolts are threaded, and said fastening means are threaded nuts.

3. The device of claim 1 wherein said plate has a forward planar surface, said bolts have heads on said head ends that are flush with the planar forward surface of said plate.

4. The device of claim 3 wherein said bolts are threaded, and said fastening means are threaded nuts.

* * * * *